W. F. ROTHENBERG.
Street-Car Propeller.

No. 226,002. Patented Mar. 30, 1880.

Witnesses
Fred G. Dieterich
Albert H. Krause

Inventor
Wm. F. Rothenberg
by A. C. Jenkins
Atty.

W. F. ROTHENBERG.
Street-Car Propeller.
No. 226,002. Patented Mar. 30, 1880.
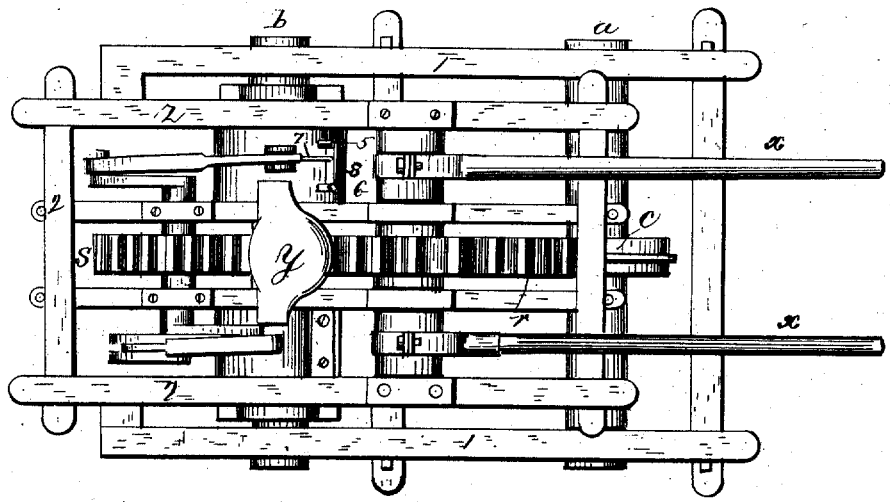
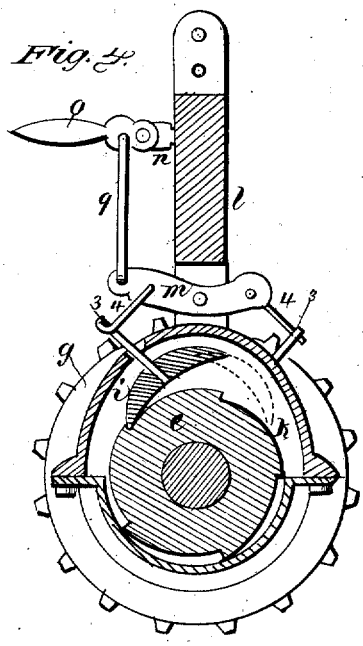
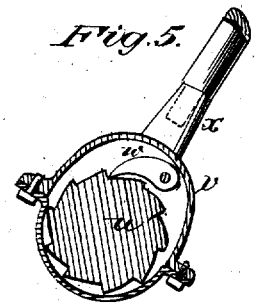

UNITED STATES PATENT OFFICE.

WILLIAM F. ROTHENBERG, OF LINCOLN, ILLINOIS.

STREET-CAR PROPELLER.

SPECIFICATION forming part of Letters Patent No. 226,002, dated March 30, 1880.

Application filed December 23, 1879.

*To all whom it may concern:*

Be it known that I, WILLIAM F. ROTHENBERG, a resident of the city of Lincoln, in the county of Logan and State of Illinois, have invented a new and useful Improvement in Propelling Street-Cars, and which may be used in propelling any kind of cars or boats used in navigation, the following being a specification thereof, reference being also had to accompanying drawings.

This invention has reference to propelling cars upon street-railways, the power being furnished by machinery operated by powerful levers which may be worked by hand.

Figure 1:
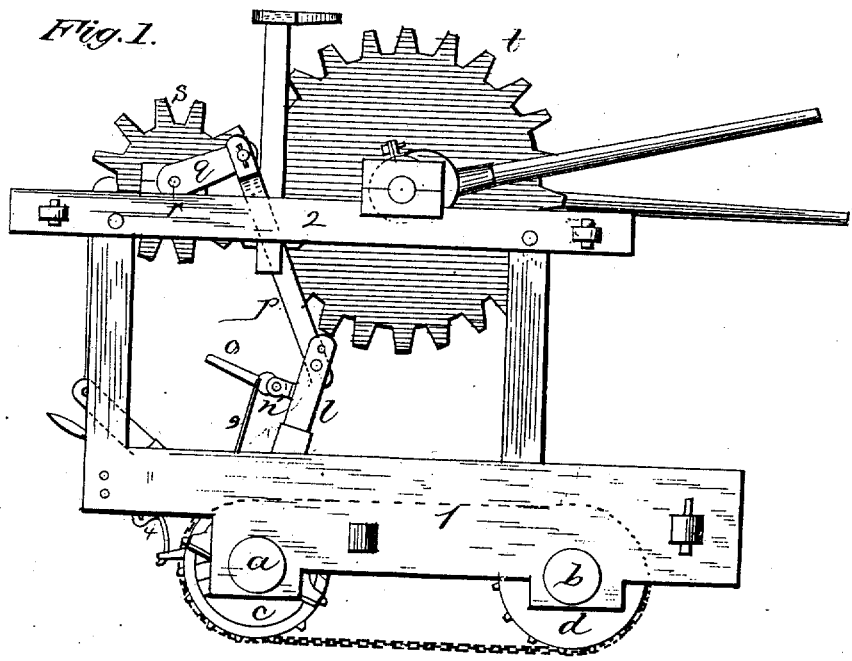
Figure 2:
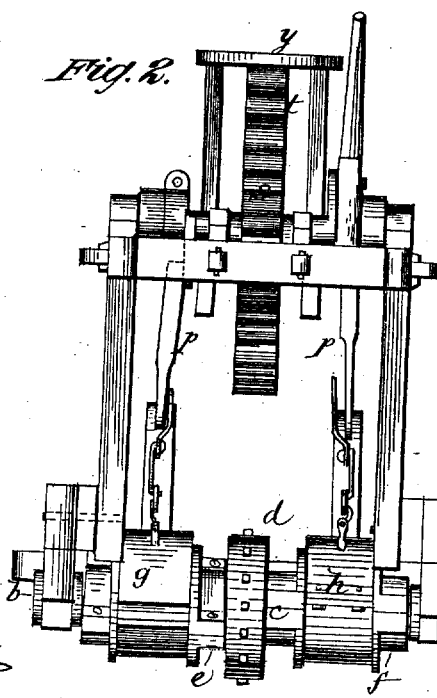

Figure 1 represents a side view; Fig. 2, an end view; Fig. 3, a top or plan view; Figs. 4 and 5, detached sectional views.

The frame-work of the machine shown in Fig. 1 is required to be of the width of the track. Across the rear end of the frame is an axle, $a$, and across the front end an axle, $b$. To the ends of these axles will be attached the car-wheels. Upon each of said axles, and equidistant from the ends thereof, is attached a circular wheel, to revolve with the axle, one lettered $c$ and the other $d$, on the rim of which are projections to fit into the apertures of an endless chain, which shall pass around both and upon the rim of each.

Upon the front axle, $b$, and upon each side of wheel $d$, is a cylinder, cast or wrought in separate halves, hollowed, and made to fit closely upon said axle, and to be, by any means practicable, so securely fastened to the axle that they will both revolve together, the separate halves of said cylinder to be so securely fastened together as to be, in connection with the axle, the equivalent of a solid cylinder. Said cylinders are lettered, one $e$ and the other $f$. They may, if preferred, be constructed by enlarging axle $b$ on each side of wheel $d$. Said cylinders $e$ and $f$ are each encircled by a substantial band, the inside of which is an exact circle, and made to work loosely around said cylinders $e$ and $f$. Said bands are lettered $g$ and $h$. They are also made in separate halves, and the halves securely fitted together by screws or otherwise after being placed around the cylinders.

The front halves of said bands are enlarged and made quite thick and heavy, and used as ratchet-boxes, the inner portion of each being grooved, and in each groove (there being three of them) is a pawl operated by machinery hereinafter explained, and made to press closely upon said cylinders $e$ and $f$ and into notches cut upon said cylinders. The outer pawls are all lettered $i$, and the inner ones $k$.

Attached to the front of said bands that constitute the ratchet-boxes is to each a lever-arm, $l$, through which, and near the end attached to the ratchet-bar, is a slit, passing entirely through it. Through each of said slits is a lever-bar, $m$, made to work loosely in said slits, but securely confined within them by bolts or pins passing through said arms and bars; or said slits may be dispensed with and the lever-bars $m$ attached to the surface of lever-arms $l$.

Through the portion of each bar $m$ extending above lever-arm $l$ are two holes, and through the upper end of each ratchet-box is a single hole, passing through it to the middle pawl, $k$. In the end of each of said bars $m$ projecting below lever-arm $l$ is a single hole, and through the lower portion of each ratchet-box are two holes, passing through to pawls $i$. Under each of said pawls is a spring to press it into one circle of the notches on cylinders $e$ and $f$.

Through the upper hole in each ratchet-box is inserted a bar or pin, 3, one end securely attached to the middle pawl, the other or outer end securely attached to the lower hole in the upper end of lever-bar $m$ by a rod, 4, passing from one to the other; and through each of the lower holes in said ratchet-boxes are similar bars or pins 5 and 6, one end attached to pawls $i$ and the other to the single hole in the lower end of lever-bar $m$ by a rod, 7, passing from the middle of a bar, 8, across the ends of said bars or pins 5 and 6 to said hole in the lower end of lever-bar $m$.

Into each lever-arm $l$ is a perpendicular short post, $n$, standing in a position parallel with lever $m$. One side of the upper end of said posts $n$ is cut away, so as to present a smooth flat surface, to which is attached a self-supporting lever-bar, $o$. By a bolt passing through said post and the lever-bar the lever $o$ is connected with lever-bar $m$ by a rod, 9, passing from the upper hole in bar $m$ to a hole in bar $o$.

Letter $p$ designates an arm, one end attached to lever-arm $l$ and the other to crank $q$, said crank being attached to shaft $r$, upon which is a cog-wheel, $s$, located on the car-platform, said arm $p$ connecting the machinery under the car with that on said platform. Cog-wheel $s$ works into a larger cog-wheel, $t$, and upon the shaft of said cog-wheel $t$, on each side of said wheel, there is cut into the shaft a single circle of notches, $u$, similar to those on cylinders $e$ and $f$, before described, and around said notches is a band, including ratchet-box $v$, similar to bands and ratchet-boxes $g$ and $h$, constructed and put together in the same manner, the inner portion containing a single groove, in which is a pawl, $w$, under which is a spring to press the pawl into said notches.

Attached to each ratchet-box $v$ is an arm or lever, $x$, to be used in working the entire machinery herein described, the operator for that purpose occupying seat $y$.

To operate this machinery by hand the operator occupies seat $y$ and works lever $x$ alternately backward and forward. By that operation the pawls $w$, working into notches $u$, revolve cog-wheel $t$, and that revolves the smaller cog-wheel $s$, turns cranks $q$, and they, in connection with arms $p$ and their connection with lever-arms $l$, give said lever-arms an alternate upward and downward motion. Lever-bar $o$ is turned forward by its attached handle, thus giving lever-bar $m$ a stationary position, and by its pull upon bar or pin 3 and rod 4 draws and retains the middle pawls, $k$, in their grooves. The alternate motion given to arm $l$, and through its attached lever-bar $m$ to rod 7 and rods 5 and 6, press the outer pawls, $i$, upon the outer circles of notches around cylinders $e$ and $f$, and, catching in said notches, rotate the front axle, $b$, and by the endless chain around wheels $c$ and $d$ all the wheels of the car are revolved. By this process the car is propelled forward.

To give a backward movement to the car the lever $o$ is turned backward by a reverse movement of the attached handle, thus removing bar $m$ to another stationary position, and by its pull upon rod 7 and bars 5 and 6 draws and retains pawls $i$ in their grooves, and the pawls $k$, acting upon the middle circle of notches around cylinders $e$ and $f$, give to the axles and attached wheels a reverse movement, thus reversing the movement of the cars.

The object of cog-wheels $s$ and $t$ is to furnish speed, and the speed may be increased or lessened by the comparative size of said wheels.

I do not confine myself to the use of cog-wheels, but may use wheels of a different character with an endless chain or belt; and, if sufficient speed can be obtained without said wheels $s$ and $t$, they may be dispensed with, and the ratchet-and-lever arrangement be applied directly to shaft $r$, instead of the shaft on wheel $t$.

To counteract any tendency to jerking or to a momentary cessation in the movement of cars, should it occur, four instead of two cranks may be used upon the same shaft, with an increased number of levers, pawls, and notches around cylinders $e$ and $f$ to correspond with the number of cranks, in which event said cylinders may be lengthened so as to furnish sufficient space for those purposes.

What I claim as new, and desire to secure by Letters Patent, is—

1. The combination, with the car-wheel shafts $a$ $b$ and intermediate connecting mechanism, of the notched cylinders $e f$, surrounding slotted bands $g h$, pawls $i k$, bars or pins 3 3 5 6, cross-bar 8, connecting-rods 4 4 7, pivoted bar $m$, lever $l$, post $n$, lever $o$, and connecting-rod 9, the several parts constructed and relatively arranged to operate substantially in the manner herein shown and described.

2. In a street-car propeller, the combination of the car-wheel shafts $a$ $b$, levers $l$ $l$, and intermediate connecting mechanism, substantially as shown and described, connecting-rods $p$ $p$, cranks $q$ $q$, shaft $r$, cog-wheels $s$ and $t$, notched shaft $u$, spring-pawls, and hand-levers $x$ $x$, the several parts constructed and relatively arranged to operate substantially in the manner herein shown and described.

WILLIAM F. ROTHENBERG.

Witnesses:
WM. B. JONES,
JAMES T. HOBLIT.